United States Patent [19]

Rosan, Jr.

[11] 4,417,380
[45] Nov. 29, 1983

[54] METHOD OF FORMING METAL RING IN A BEARING
[75] Inventor: Jose Rosan, Jr., Newport Beach, Calif.
[73] Assignee: Rexnord Inc., Milwaukee, Wis.
[21] Appl. No.: 305,134
[22] Filed: Sep. 24, 1981
[51] Int. Cl.³ .................... B23P 11/00; F16C 13/00; F16C 35/00
[52] U.S. Cl. ...................... 29/148.4 R; 29/148.4 A; 29/515; 29/521; 29/520
[58] Field of Search ................ 29/148.4 A, 521, 515, 29/520, 148.4 R; 308/189 R
[56] References Cited
U.S. PATENT DOCUMENTS

| 848,776 | 4/1907 | Sisson | 29/148.4 A |
| 2,422,612 | 6/1947 | Borne | 29/521 |
| 3,443,617 | 5/1969 | Whiteside et al. | 29/520 X |
| 4,125,298 | 11/1978 | Heurich et al. | 29/148.4 A |

Primary Examiner—Francis S. Husar
Assistant Examiner—V. K. Rising
Attorney, Agent, or Firm—Robert H. Kelly

[57] ABSTRACT

A method of securing a bearing either bushing, roller or ball bearing and a spacer or fitting into a soft non-ferrous material such as aluminum and materials of that hardness. A bearing of this invention containing an annular groove and adjacent forming shoulder or spacer, at least ½ a millimeter greater in diameter than the body of the bushing is inserted into a predrilled hole. A metal ring is formed in the annular groove as the shoulder is pressed into the parent material. This metal ring being a part of the parent material and being packed into the annular groove prevents retraction of the bearing or spacer during operation by its diameter being greater than the annular groove in the bearing. The material in the annular groove is of a lesser diameter than the body of the bearing and fitting and interfers with axial movement. The shoulder of the bearing or fitting has longitudinal grooves around its circumference. As the shoulder is embedded in the parent material the shape of these grooves are formed in the parent material. The formation of these shapes action prevents the bearing or spacer from rotating during operation. Either type of bearing, bushing, roller or ball may utilize this invention as can spacers or fittings of all sizes.

1 Claim, 10 Drawing Figures

}

METHOD OF FORMING METAL RING IN A BEARING

BACKGROUND OF THE INVENTION

1. Field of the Invention

This invention refers to a method of inserting a bearing or fitting either a ball bearing or roller bearing or bushing bearing or spacer into soft non-ferrous materials like aluminum and materials with a similar degree of flow under cold pressure.

2. Description of the Prior Art

Various methods are described in the prior art for inserting objects into relatively soft non-ferrous materials. Most involve threading a bearing or establishing a friction fit between the bearing and parent material. These methods are described in various patents for uniting materials or holding machines in place.

Among these patents are U.S. Pat. Nos. 2,707,824; 3,952,399; 3,125,493 and 3,872,572. All of these prior patents fail to recognize the method of forming a metal ring of displaced material from the patent body within an annular groove on the bearing. This metal ring being larger in diameter than the annular groove of the body holds the bearing in place after insertion in the parent material.

SUMMARY OF THE INVENTION

The applicant has conducted many tests inserting various size bearing and spacers or fittings of all varieties and shapes into non-ferrous materials. All of these bearings and fittings came loose after use for various lengths of time. Experimentation with design and materials continued until the present invention was conceived. Tests with the present invention have shown loosening or movement in bearings or spacers whether bushing type, roller bearing or ball bearing after 1,000 hours of continuous use in vibrating electric motors and gas engines. The method of using an annular groove in combination with a forming shoulder that flows material from the parent material during insertion is unique. Material is formed by the annular groove into a metal ring that is firmly joined to the parent and prevents movement of the bearings or fittings by being of a smaller diameter than the body of the object inserted.

A similar effect is produced by serrating the upper side of the bearing or spacer device. During insertion, parent material is formed into the depressed valleys of the serrations thus preventing rotational movement of the inserted bearing or spacer.

The compound effect of these actions is to provide a method of inserting a bearing or spacer into a relatively soft non-ferrous material that firmly anchors the bearing or spacer regardless of the type in the material if ductile enough and prevents loosening in spite of the adverse working conditions in various working environments.

It is an object of this invention to provide a method of firmly anchoring various size and types of bearings or spacers into relatively soft non-ferrous materials like aluminum and the like.

It is a further object of this invention to form a metal ring of parent material within the annular groove and have this metal ring firmly attached to the parent material.

It is still a further object of this invention to actually swage or form parent material by the insertion of the bearing or spacer in the workpiece and action of the forming shoulder on the workpiece.

It is still a further object to provide a serration in the top of the bearing to prevent rotational action.

Further objects, advantages and features of this invention will be apparent on the consideration of the following detailed description of the preferred embodiment and the accompanying drawings.

DESCRIPTION OF THE PREFERRED EMBODIMENT

Figure 1:
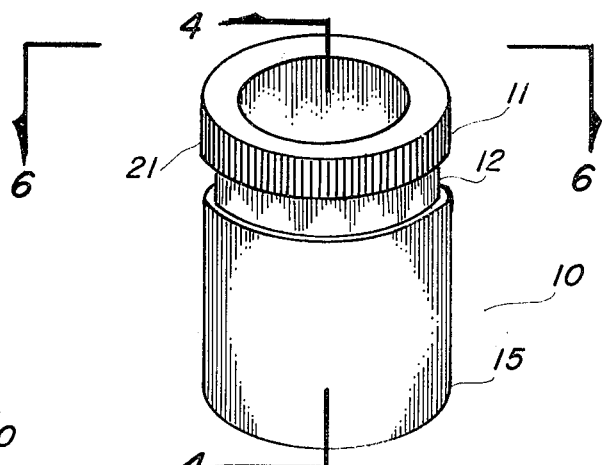
FIG. 1 is a front enlarged view of the bushing type bearing with an annular groove and cutting shoulder.
Figures 2, 3:
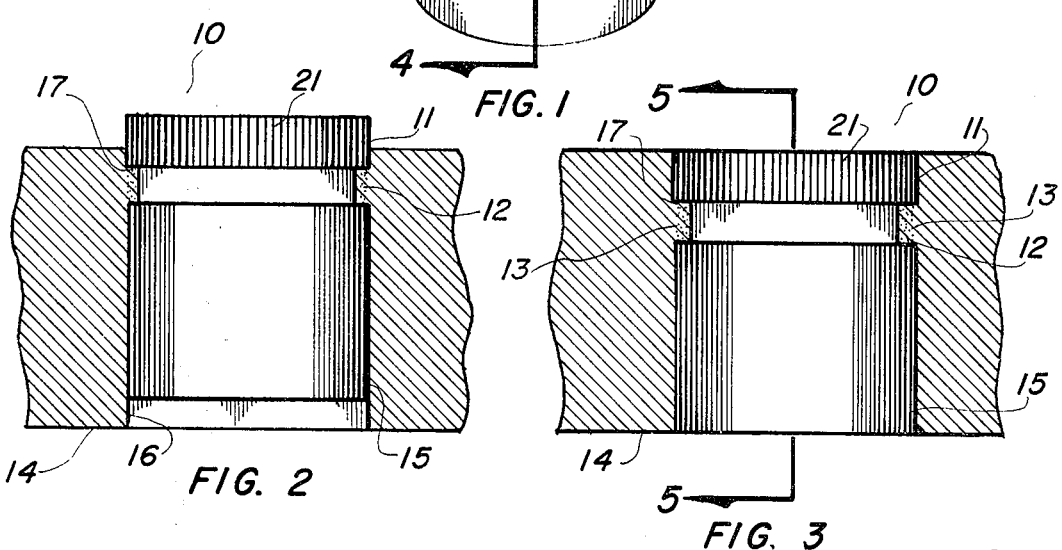
FIG. 2 is an enlarged view of the bushing type bearing and bushing spacer or fitting being inserted in parent material forming a metal ring by swaging material.
FIG. 3 is an enlarged view of a metal ring of parent material completely filling the annular groove and anchoring the bushing type bearing and bushing spacer into the parent material.
Figures 4, 5:
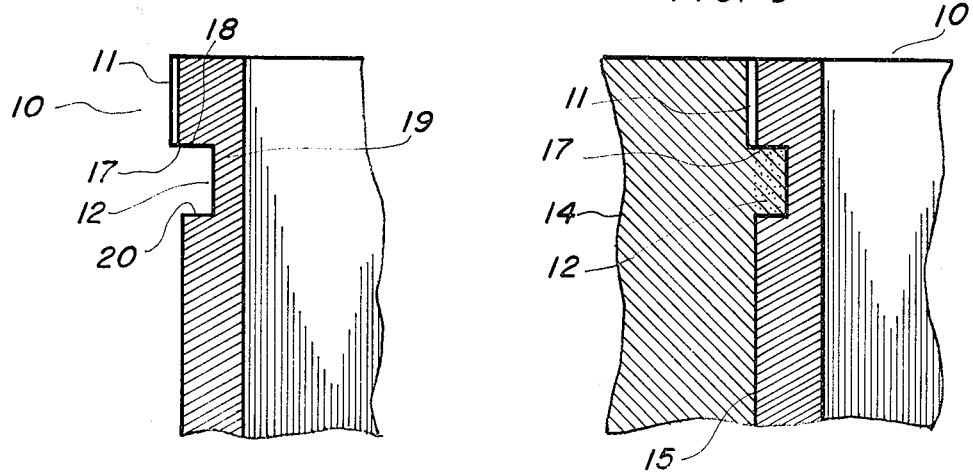
FIG. 4 is a cross-section view through 4—4 of FIG. 1.
FIG. 5 is a cross-section view of FIG. 3.
Figure 6:
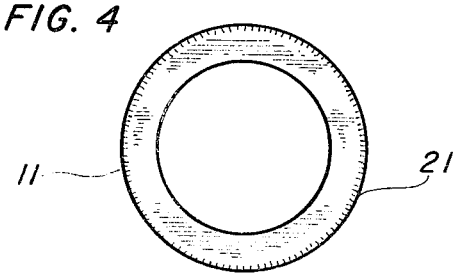
FIG. 6 is a view of the serrated top of the bushing type bearing.

Referring now to FIGS. 1-3 we see that the bushing type bearing and fitting or spacer of this method is composed of a metal cylinder 10. The upper portion 11 is at least ½ a millimeter greater in diameter than the lower portion 15 and ends in forming shoulder 17 and an annular groove 12 located at most ¼ the distance from top to bottom of cylindrical body 10. The annular groove 12 is at least ½ a millimeter deep and 1 millimeter in length and helps form the metal ring 13. The parent material which can be a non-ferrous engine block 14 is prebored with a hole 16 that is equal or greater than the lead diameter of the lower portion 15.

The lower portion 15 is first positioned above hole 16 and then inserted in hole 16 with tools common to the trade (not shown). Forming shoulder 17 swages parent material from the engine block 14 and forms metal ring 13 within annular groove 12. It can be seen that metal ring 13 is fastened to and of the same material sa parent material 14. It rigidly locks bushing type bearing 10 into hole 16 preventing axial movement during operation and the serrations prevent rotational movement.

This interaction of the diameter of metal ring 13 and metal walls 18, 19 and 20 is the cause of this locking effect. A series of serrations 21 cut on top edge 11 of sufficient depth to receive formed metal from the parent material when inserted prevent rotational movement due to that metal filling the serrations 21. Repeated engine tests have demonstrated no loosening of bushing type bearings 10 and spacer or fittings or ball bearing 40 or roller bearing type 31 after 1,000 hours of continuous testing.

Figure 7:
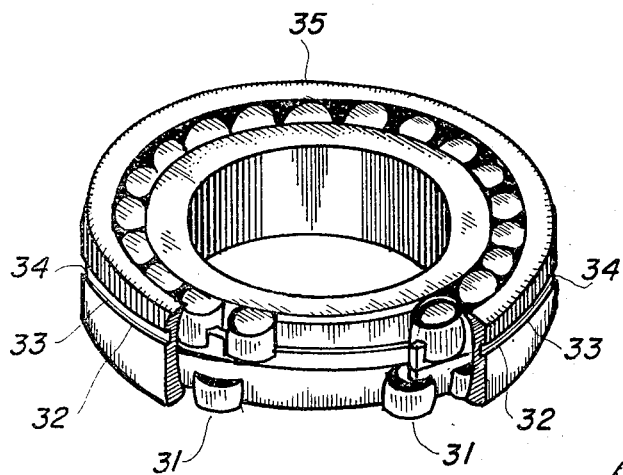
FIG. 7 is a view of a roller type bearing of this invention.

FIG. 7 illustrates another form of bearing device, the roller bearing 31 with forming shoulder 32 similar to 17 and metal ring 33 formed within annular groove 34. Metal ring 33 is similar to 13 and annular groove 34 similar to 12. Serrations 35 are cut in the upper face of roller bearing 31 in a similar manner as 21 on 11.

Figure 8:
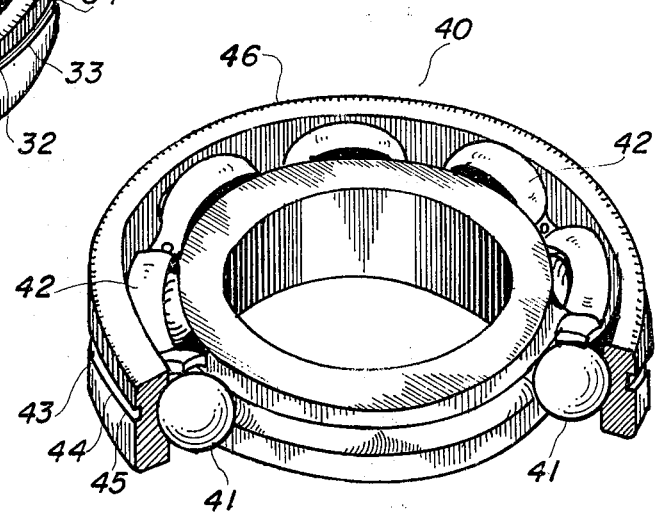
FIG. 8 is a view of a ball type bearing of this invention.
Figure 9:
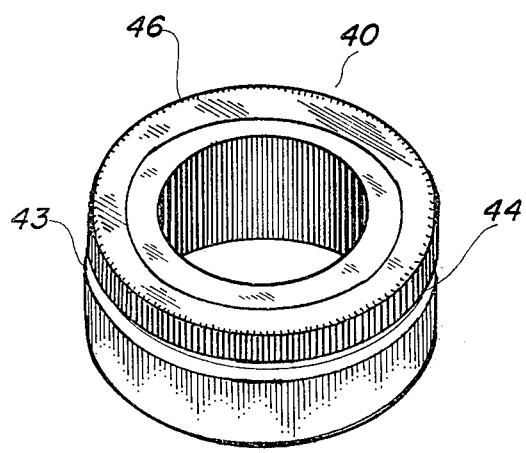
FIG. 9 is a top view of the serrations of a bearing.

FIG. 8 is an illustration of a third kind of bearing known as the ball bearing 40. In this bearing the balls 41 are in races 42. The annular groove 43, the forming shoulder 44, the metal ring 45 and the serrations 46 are similar to their counterparts 12, 17, 13 and 21 on the bushing type and function in the same way. The serrations 46 perform the same action as 21 on 11.

Figure 10:
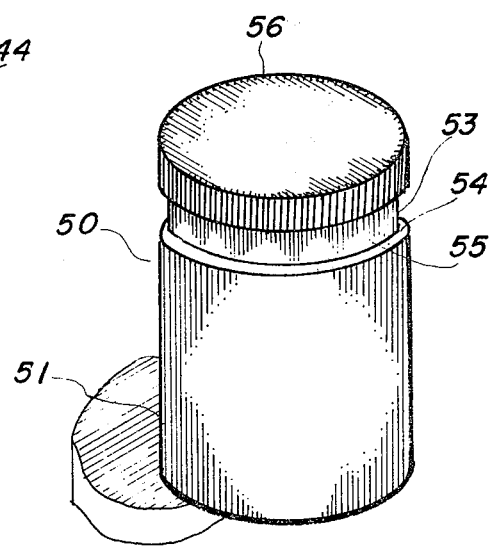
FIG. 10 is a spacer or fitting of this invention.

FIG. 10 illustrates another mode of the invention. In this case, the object is a spacer or fitting 50 which is inserted in a counter bored hole 51 in the same manner. The annular groove 53, the forming shoulder 54, the metal ring 55 and the serrations 56 all act in the same fashion as their counterparts 12, 17, 13, and 21 on the bushing type bearing and function in the same way. The serrations 57 perform the same way as 21 on 11.

I claim:

1. A method of inserting a bushing means into a soft non-ferrous material such as aluminum comprising the steps of:
   (a) first preparing a special bushing means which contains an upper portion having an area about 25% of the distance from the top which is about ½ a millimeter greater in diameter than the lower portion; this greater diameter area ends in a forming shoulder;
   (b) adding serrations to the upper portion of said bushing means;
   (c) preparing an annular groove about ½ millimeter deeper than said lower portion and about 1 millimeter in length between said upper portion and said lower portion;
   (d) preparing a bore in a workpiece of said soft non-ferrous material generally equal in diameter to the lower portion of said bushing means;
   (e) inserting said bushing means into the bore;
   (f) forming a metal ring within the annular groove by the swaging action of the forming shoulder upon said workpiece; and
   (g) locking said bushing means into said workpiece by the forming action of the metal ring of the workpiece material, the annular groove of the bushing means and the serrations in the upper portion.

* * * * *